United States Patent [19]

Kondo

[11] Patent Number: 5,003,153

[45] Date of Patent: Mar. 26, 1991

[54] LASER BEAM MACHINING AND APPARATUS THEREFOR

[75] Inventor: Hiroaki Kondo, Komaki, Japan

[73] Assignees: Kabushiki Kaisha, Nagoya; Iida Kogyo Kabushiki Kaisha, Aichi, both of Japan

[21] Appl. No.: 547,856

[22] Filed: Jul. 2, 1990

[30] Foreign Application Priority Data

Jul. 4, 1989 [JP] Japan .................................. 1-172500
Nov. 21, 1989 [JP] Japan .................................. 1-302811

[51] Int. Cl.$^5$ ............................................ B23K 26/00
[52] U.S. Cl. ............................ 219/121.68; 219/121.63; 219/121.69; 219/121.78; 219/121.82
[58] Field of Search ..................... 219/121.68, 121.69, 219/121.67, 121.78, 121.82, 121.84, 121.83, 121.72, 121.74

[56] References Cited

U.S. PATENT DOCUMENTS

| | | | |
|---|---|---|---|
| 3,404,254 | 10/1968 | Jones | 219/121.69 X |
| 3,663,793 | 5/1972 | Petro et al. | 219/121.68 X |
| 3,739,083 | 6/1973 | Landsman | 219/121.69 X |
| 4,406,939 | 9/1983 | Golker | 219/121.68 X |
| 4,480,169 | 10/1984 | Macken | 219/121.74 X |
| 4,947,022 | 8/1990 | Ostroff et al. | 219/121.83 X |

Primary Examiner—C. L. Albritton
Attorney, Agent, or Firm—Koda & Androlia

[57] ABSTRACT

A laser machining process and an apparatus therefor, in which a main sensor is moved for scanning relative to a scanning model having a machining pattern depicted thereon, and a laser beam generator is moved, in synchronization with this scanning, relative to a work piece comprising a rubbery material so as to effect laser beam irradiation on the work piece in accordance with the pattern detected by the main sensor; characterized in that said main sensor has a sub-sensor for detecting the machining pattern prior to the detection by the main sensor and that control of the output of the laser beam generator is achieved by stepwise shifting in accordance with the pattern detection by these sub-sensor and main sensor, whereby multi-stepped protrusions are formed on the surface of the work piece. The scanning model and the work piece may be loaded on the same table for moving them synchronously for the scanning and the laser beam irradiation, respectively; or alternatively they may be loaded on separate disc-shaped tables which are driven in the opposite directions for obtaining a negative from a positive pattern or in the same direction for reproducing the original pattern as multi-stepped protrusions.

4 Claims, 9 Drawing Sheets

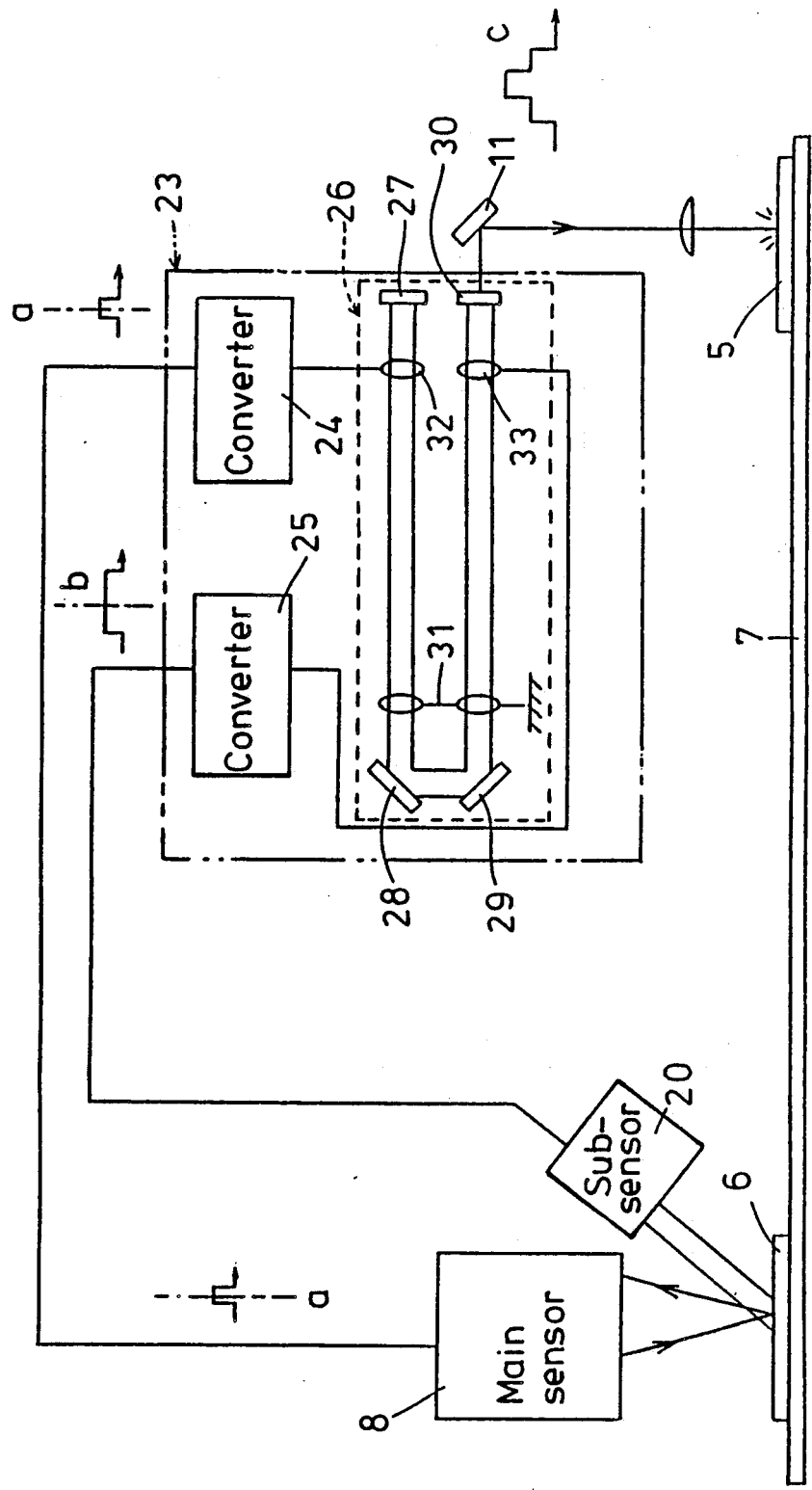

LASER BEAM MACHINING AND APPARATUS THEREFOR

BACKGROUND OF THE INVENTION

This invention relates to a laser beam machining process and an apparatus therefor, more particularly to a novel laser beam machining process and an apparatus, for the machining of a work piece such as of an impression material comprising a rubbery material typified by natural rubbers and elastomers to form seals or stamps, which can provide a printing face with increased strength and improve ink permeability in porous materials to overcome printing nonuniformity.

In a conventional laser beam machine of the structure schematically shown in FIG. 12, a work piece 5 comprising a rubbery material typified by a natural rubber or elastomer and a model to be scanned 6 (scanning model) having a pattern depicted thereon such as letters and the like to be carved on the surface of the work piece 5 are placed on a work table 7. A pattern sensor 8 is disposed above the scanning model 6, whereas a laser beam generator comprising a laser energy source g and a laser oscillator 10 is disposed above the work piece 5. The work table 7 which is designed to be driven by a reciprocator (not shown) is reciprocated sequentially in a horizontal direction relative to the pattern sensor 8 and the laser oscillator 10, whereupon the pattern sensor 8 detects the pattern depicted on the scanning model 6 as it passes directly below the sensor 8.

During the time when the sensor 8 is not detecting the pattern (i.e. when the sensor 8 is scanning the white ground of the scanning model 6 having a black pattern depicted thereon), a signal detecting the white ground is transmitted to the laser energy source 9, and the laser energy source 9 energizes the laser oscillator 10 to give 100% output. Accordingly, the laser beam irradiated from the laser oscillator 10 is reflected on a reflector 11 to impinge upon the surface of the work piece 5, whereby counters are carved as the work table 7 is reciprocated sequentially. On the other hand, when the scanning by the sensor 8 transits from the white ground to the black portion, a signal detecting the black portion is transmitted from the sensor 8 to the laser energy source 9, whereupon the laser irradiation onto the surface of the work piece 5 is interrupted. By repeating the feeding motion of the work table 7, per one cycle of the horizontal reciprocating motion thereof, in the horizontal direction orthogonal to the reciprocating direction, the surface of the work piece 5 is carved taking exactly or approximately after the pattern depicted on the scanning model 6.

FIG. 10 shows, in cross section, protrusions 1 formed, according to a conventional technique such as hand carving or plate making, on the surface of a work piece comprising a rubbery material such as a natural rubber or elastomer for making a seal or stamp. As shown in FIG. 10, the bottom width of the protrusions 1 is made wider than the top width on which an ink including vermilion seal-ink is applied; in other words the protrusions have a trapezoidal cross section. The reason is to improve the physical strength of the protrusions 1 to prevent damage thereof and extend the life of the machined work piece since the rubbery material is soft unlike hard work pieces such as ivory.

On the other hand, FIG. 11 shows also, in cross section, protrusions 2 formed, according to the conventional laser beam machine described above, on the surface of a work piece comprising a rubbery material for making a seal or stamp. As apparent from the drawing, the protrusions 2 are carved perpendicularly to the machining surface according to the conventional laser machining technique to form deep notches 3 at the counters. Moreover, in some depth range, such notches become rather wider and the protrusions 2 come to have inverted trapezoidal cross sections having wider top width than the bottom width, whereby the physical strength of the protrusions 2 is reduced, making the seal or stamp to have shorter life and to be susceptible to damage, disadvantageously. In the case of a stamp made of a porous impression material used as impregnated with an ink, even supply of ink is prevented by the presence of such notches 3 to cause insufficient ink delivery.

The phenomenon that the protrusions 2 are perpendicularly carved cannot be get rid of in the conventional technique where a laser beam is irradiated perpendicularly down onto the surface of the work piece, and the control of the laser beam is achieved by on/off switching operation. It has been found that the reason why such notches 3 are formed is, as can be seen from the output characteristics of the laser oscillator shown in FIG. 11, because the momentary high power laser beam is emitted upon off-to-on switching.

On the other hand, it is well known that the shallower is the machining depth, the narrower can be the laser machining spot providing better definition. In this connection, it can be pointed out that due to the fact that seals or stamps are naturally required to have a rather deeper depth and that the definition achieved by the laser beam machining will thus be lowered, the protrusions formed thereby tend to be thinner or collapsed, disadvantageously, if the depth necessary for the seals and the like is secured.

This invention is proposed in view of the problems inherent in the conventional laser machining technique and for solving them successfully, and is directed to provide a laser beam machining process in which the protrusions to be formed on the surface of a work piece comprising a rubbery material typified by a natural rubber or elastomer by means of laser beam machining cannot be collapsed easily, and by which spread or delivery of ink and the like can be improved, and an apparatus therefor.

SUMMARY OF THE INVENTION

In order to overcome the above problems and attain the intended object in a suitable manner, this invention provides a laser machining process in which a main sensor is moved for scanning relative to a scanning model having a machining pattern depicted thereon, and a laser beam generator is moved, in synchronization with this scanning, relative to a work piece comprising a rubbery material such as a natural rubber or elastomer so as to effect laser beam irradiation on the work piece in accordance with the pattern detected by the main sensor, characterized in that said main sensor has a sub-sensor for detecting the machining pattern prior to the detection by the main sensor and that control of the laser beam generator output is achieved by stepwise shifting in accordance with the pattern detection by these sub-sensor and main sensor, whereby multi-stepped protrusions are formed on the surface of the work piece.

Another aspect of this invention is to provide a laser beam machine, for practicing the above process in a suitable manner, having a main sensor for scanning a scanning model to detect the machining pattern depicted thereon, a laser beam generator for irradiating a laser beam onto the surface of a work piece comprising a rubbery material such as a natural rubber or elastomer in accordance with the pattern detected by the main sensor, and a reciprocator which reciprocates the laser beam generator relative to the work piece in synchronization with the scanning of the machining pattern, characterized in that the laser beam machine further comprises:

a sub-sensor for scanning the scanning model to detect the machining pattern depicted thereon in synchronization with the main sensor; and a pair of control means which perform stepwise switching of the laser beam generator output in accordance with the machining pattern detected by the sub-sensor and the main sensor; wherein the sub-sensor is designed to be always capable of detecting the machining pattern of the scanning model prior to the detection by the main sensor even when the direction of moving the scanning model by the reciprocator is changed.

Further aspect of this invention for practicing the above process in a suitable manner is to provide a laser beam machine, having a main sensor for detecting the machining pattern depicted on a scanning model, and a laser beam generator for irradiating a laser beam onto the surface of a work piece in accordance with the pattern detected by the main sensor, characterized in that the laser beam machine further comprises:

a first table mounted on a first shaft rotatably supported in the laser beam machine so that it can load the scanning model thereon in position;

a second table mounted on a second shaft rotatably supported in the laser beam machine so that it can load the work piece thereon in position;

a drive means for rotating the first table and the second table in the directions opposite to each other;

a sub-sensor disposed above the first table to be capable of detecting the pattern depicted on the scanning model prior to the scanning by the main sensor;

a feeding means for feeding the first and second tables in the radial direction relative to the main sensor and sub-sensor and the laser beam generator, correspondingly; and a control means which controls stepwise the output of the laser beam generator in accordance with the machining pattern detected by the sub-sensor and the main sensor.

By the stepwise control of the laser beam output with the plurality of sensors 8 and 20 which detect the machining pattern of the scanning model 6 at staggered times or positions in accordance with the pattern detection by these sensors 8 and 20, a multi-stepped protrusion (two-stepped protrusion in the second embodiment) can be formed as shown in FIG. 1. Accordingly, the protrusion is approximated to a trapezoidal cross section having a bottom width greater than the top width as formed by hand carving as shown in FIG. 10, whereby the physical strength of the two-stepped protrusion 40 can be increased to prevent damage thereof, and also well-conditioned spreading or delivery of ink can be achieved by the absence of deep notches which hinder even supply of ink.

As has been described above, a rubber stamp and the like formed according to the laser beam machining process of this invention can enjoy a longer life, since the mechanical strength of the protrusion can be increased by the multi-stepped form achieved by the stepwise control of the laser beam output. The present process also effectuates formation of rubber stamps and the like allowing excellent spreading of ink.

When a porous material is used as the impression material, the ink impregnated therein cannot be delivered to the printing surface if the protrusion is not multi-stepped as in the conventional technique, causing nonuniformity in the printed matter. However, such printing nonuniformity can completely be cleared by forming multi-stepped protrusions according to the present process, since the protrusions come to have a greater bottom to facilitate delivery of the ink to the printing surface.

According to the third aspect of this invention as claimed in claim 3, a machining pattern can directly be reproduced on a work piece as a negative pattern by scanning a scanning model having a positive machining pattern depicted thereon by the main sensor. Moreover, the definition of the machined work piece can be improved since the laser beam generator and the work piece are rotated relative to each other so that the work piece is constantly moved in a fixed direction relative to the laser beam generator to prevent occurrence of error effectively. Further, the process of this invention is advantageous in that it allows continuous processing of the work pieces to reduce machining time.

BRIEF DESCRIPTION OF THE DRAWINGS

FIG. 2 shows a constitution of the laser beam machine according to the first embodiment of this invention.

DETAILED DESCRIPTION OF THE INVENTION

The laser beam machining process according to this invention will now be described correlated with an apparatus in which the present process can suitably be practiced by way of preferred embodiments. Incidentally, the work pieces to be subjected to laser beam machining in such embodiments are of rubbery materials typified by natural rubbers or elastomers, which are all suitably used as impression materials for seals, stamps, etc.: (i) natural rubbers; and (ii) high polymeric elastomers including synthetic rubbers and elastomeric plastics, e.g. low-density polyethylenes, soft vinyl chloride plastics, etc. Work pieces comprising such rubbery materials of course include porous materials allowing excellent permeation of ink.

(First preferred embodiment)

Figure 12:
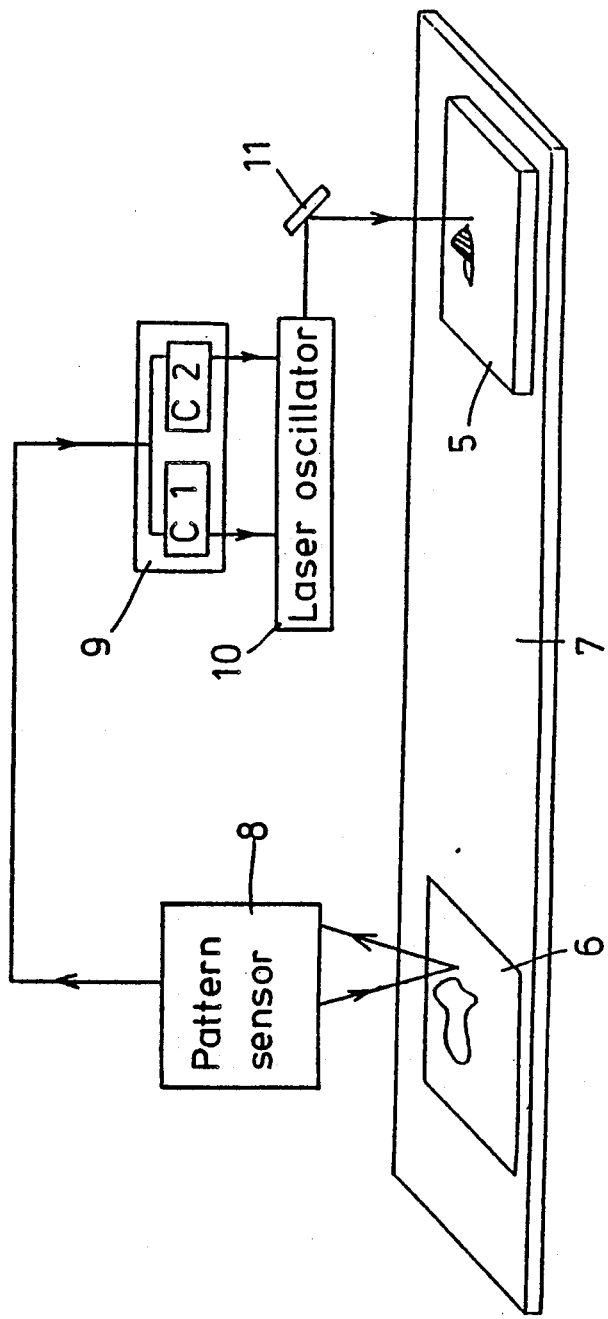
FIG. 12 is a schematic constitution of a conventional laser beam machine.

FIG. 2 shows a constitution of the laser beam machine according to a first embodiment of this invention. Since this laser beam machine is intended for two-stepped carving, the machine additionally has a sub-sensor 20 and a two-stage output system laser beam generator 23 as compared with the conventional laser beam machine shown in FIG. 12.

The laser beam generator 23 has, as the laser energy sources, a converter 24 which generates power corresponding to the detection signal from the pattern sensor 8 (hereinafter referred to as "main sensor") and another converter 25 which generates power corresponding to the detection signal from the sub-sensor 20. The converter 24 is designed to generate maximum power upon detection of the white ground of the scanning model 6 by the main sensor 8, whereas to interrupt power supply upon detection of the machining pattern 6a (black portions). The other converter 25 is also designed to generate maximum power upon detection of the white ground of the scanning model by the sub-sensor 20 whereas to interrupt power supply upon detection of the machining pattern 6a (black portions).

The laser oscillator (laser resonator) 26 in the laser beam generator 23 has total reflection mirrors 27, 28 and 29, a half mirror 30, grounding electrode 31, an electrode 32 connected to the converter 24 and an electrode 33 connected to the converter 25.

The visual field 8a of the main sensor 8 and the visual field 20a of the sub-sensor 20 are in such relationship that the former locates concentrically with the latter. Accordingly, the sub-sensor 20 detects the machining pattern 6a not only prior to the detection of the scanning model 6 by the main sensor 8, but also after completion of the detection of the pattern 6a by the main sensor 8 for a predetermined time.

(Function of the first embodiment)

Next, function of the laser beam machine according to the first embodiment having such constitution as described above will be described. While the main sensor 8 and the sub-sensor 20 are both detecting the white ground during the horizontal reciprocating motion (left to right) of the work table 7 in the laser beam machine shown in FIG. 2, the two converters 24 and 25 are both supplying the maximum powers across the grounding electrode 31 and the electrode 32 and across the grounding electrode 31 and the electrode 33, respectively (see FIG. 3). Accordingly, the laser beam is irradiated at the maximum intensity through the half mirror 30, whereby counter is formed on the surface of the work piece 5.

When the machining pattern 6a enters into the visual field 20a of the sub-sensor 20 after some cycles of feeding the work table 7, detection signal b from the sensor 20 is inputted into the converter 25, whereupon the power supply from the converter 25 is interrupted; wherein the converter 24 is still supplying the maximum power since the machining pattern 6a is not detected in the visual field 8a of the main sensor 8. In other words, when only the sub-sensor 20 is detecting the machining pattern 6a, the laser oscillator 26 is oscillated by the power supplied from the converter 24 only, so that the output of the laser beam irradiated through the half mirror 30 is halved as compared with the case where the power supply is at the maximum level. Accordingly, the depth of the counter carved here by the laser beam will be the half of the depth to be carved at the time of the maximum output level, and thus an intermediate step 40a is formed, as shown in FIG. 1.

Figure 1:
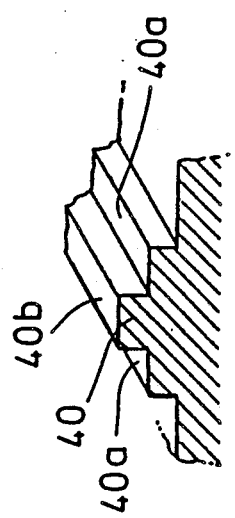
FIG. 1 shows in cross section, the surface of a rubber stamp formed according to a first embodiment of the present laser machining process.

If the machining pattern 6a enters into the visual field 8a of the main sensor 8 while the power supply from the converter 25 is interrupted, the detection signal b from the sensor 8 is received by the converter 24, and the power supply from the converter 24 is interrupted, whereby the top face 40b (on which an ink including a vermilion seal-ink is applied) can be formed as shown in FIG. 1.

When the machining pattern 6a moves away from the visual field 8a of the main sensor 8 after some cycles of feeding the table 7, power supply from the converter 24 is resumed. Since the sub-sensor 20 is still detecting the machining pattern 6a at this moment, power supply from the converter 25 is interrupted. Accordingly, laser beam carving at the half output level is carried out to form another intermediate step 40a (see FIG. 1). Subsequently, with the moving of the machining pattern 6a away from the visual field 20a of the sub-sensor 20, power supply from the converter 25 is resumed, and thus the laser beam is outputted again at the maximum level. Namely, with the shifting of the laser beam output c, as shown in the time chart of FIG. 3, the two-stepped protrusion 40 can be formed on the surface of the work piece 5 as shown in FIG. 1. By repeating the motion of feeding the work table 7, per one cycle of horizontal reciprocating motion thereof, in the horizontal direction orthogonal to the reciprocating direction to effect scanning of the entire surface of the scanning model 6 with the two sensors 8 and 20, a two-stepped protrusion 40 corresponding to the machining pattern 6a depicted on the scanning model 6 can be reproduced on the surface of the work piece 5 as protrusions.

(Variation of the first preferred embodiment)

Figure 4:
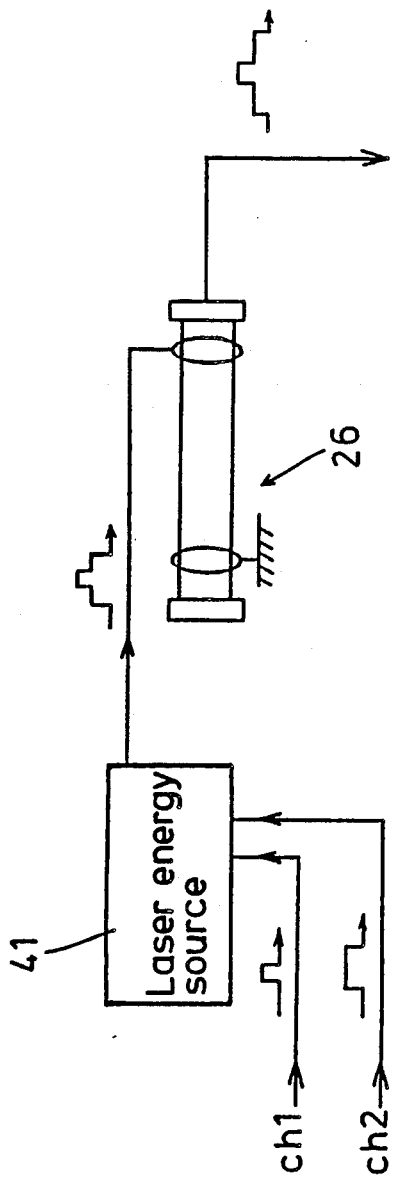
FIG. 4 shows a constitution of the major sections of a variation of the laser beam machine according to the first embodiment of this invention.
Figure 5:
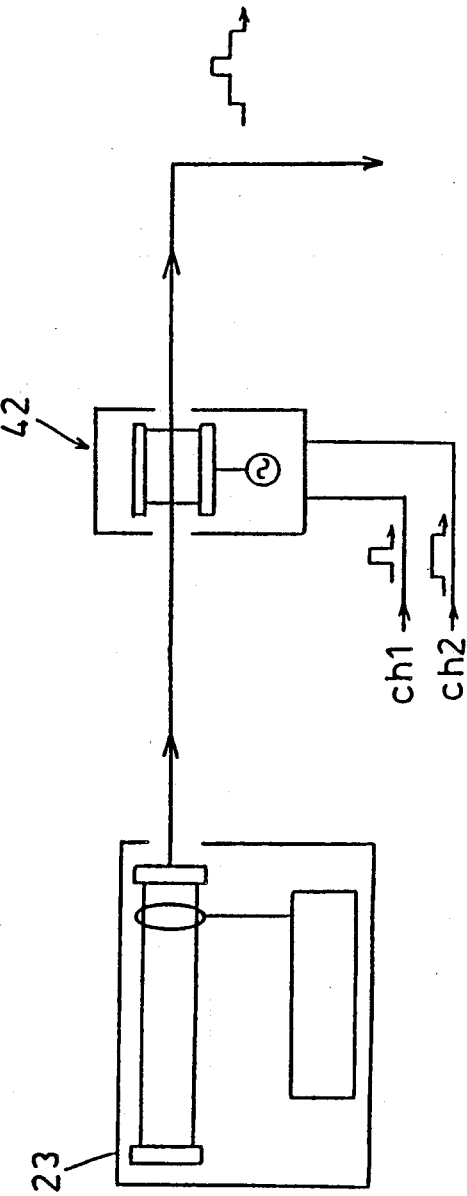
FIG. 5 shows a constitution of the major sections of another variation of the laser beam machine according to the first embodiment of this invention.

While the laser beam output is designed to be adjusted in two steps using two pairs of discharge electrodes in the laser beam machine shown in FIG. 2, it is also possible to use, as shown in FIG. 4, a laser resonator 26 having a pair of discharge electrodes and a laser energy source 41 which can control the power to be supplied across these electrodes in two steps whereby to achieve laser machining in the same manner. Further, as shown in FIG. 5, a single level output of laser beam irradiated from the laser beam generator 23 can also be controlled in multiple steps by allowing the laser beam to pass through a light modulator 42. Incidentally, while in the first embodiment such control is designed to be performed in two steps, it can of course be performed in more than two steps.

(Second preferred embodiment)

To confirm the function of the laser beam machine according to the first preferred embodiment before describing a second preferred embodiment, the machining pattern 6a depicted on the scanning model 6 is carved on the surface of a work piece 5. Accordingly, when a negative of a desired pattern is to be carved on the work piece 5 such as in seals or stamps, the negative pattern must preliminarily be depicted on the scanning model 6. Namely, when a desired pattern comprising letters or image are to be carved to form a seal or stamp, a negative must first be formed from the original pattern which is transferred onto the scanning model 6. It should be noted here that the term "positive" is to be understood as the normal image, whereas the term "negative" as the reversed image like the mirror image.

Figure 6:
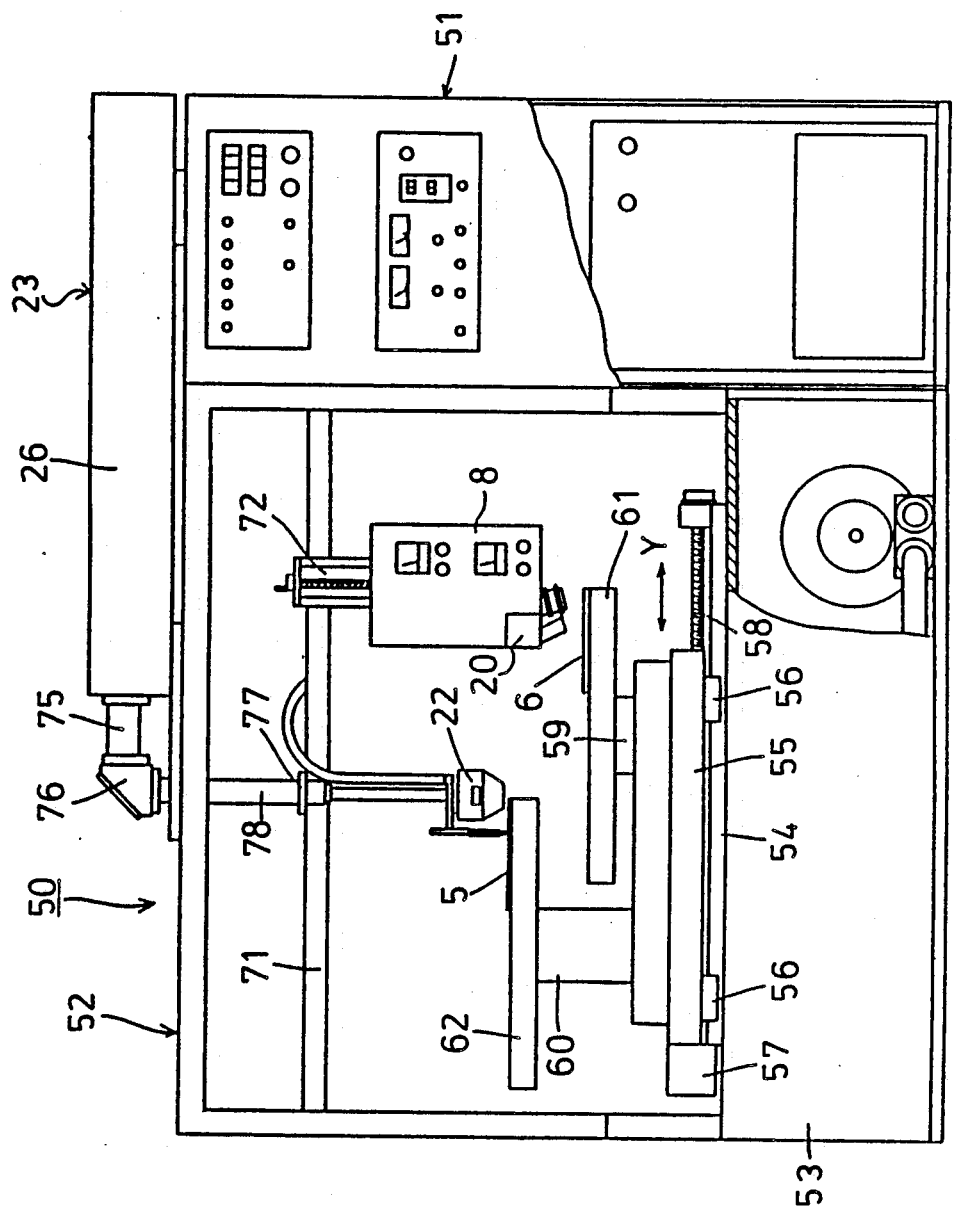
FIG. 6 shows a partially cutaway front view of a second embodiment of the laser beam machine of this invention.

Now, referring to the apparatus of the second preferred embodiment shown in FIG. 6, a positive pattern depicted on a scanning model 6 is designed to be scanned to reproduce it directly as a negative on the work piece.

To describe in detail, the laser beam machine 50 shown in FIG. 6 comprises a control unit 51 having a laser beam generator 23 consisting of a laser oscillator 26 (to be described later), a laser energy source (not shown), etc. and motors 63 and 57, etc. accommodated therein and a machining unit 52 which performs machining of a work piece 5. Incidentally, an adjustable speed motor such as servo motor can be used as the motors 63 and 57.

Figure 7:
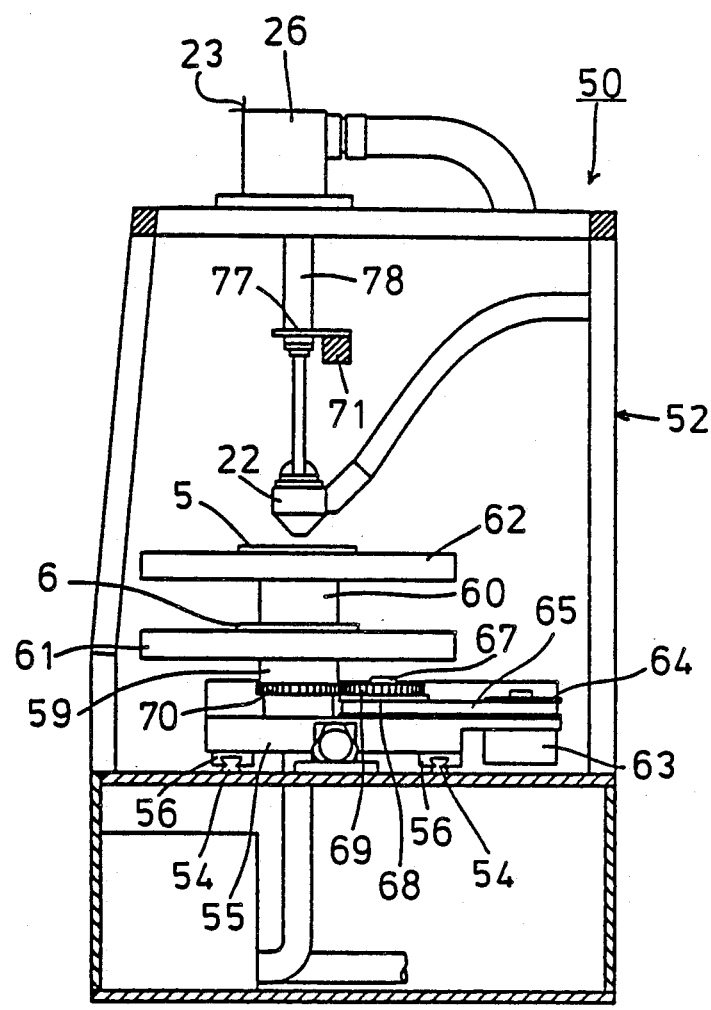
FIG. 7 shows a cross-sectional side view of the laser beam machine shown in FIG. 6.

On the upper surface of the base 53, a constituent of the machining unit 52, a pair of parallel guide rails 54 are disposed with a predetermined space therebetween, on which a feed table 55 is slidably mounted. On the lower surface of the feed table 55, a plurality of sliding members 56 are attached with predetermined intervals as shown in FIG. 7, the sliding members 56 being slidably fitted on the guide rails 54. The motor 57 is mounted on the left end portion (FIG. 6) of the base 53, with a threaded shaft 58 fixed to the rotary shaft (not shown) of the motor 57 with a coupling (not shown) extending between said pair of guide rails 54 in parallel therewith. A nut (not shown) is attached to the feed table 55 in which the threaded shaft 58 is screwed, so that the table 55 can be fed in the direction Y along the guide rails 54, under the cooperation of the threaded shaft 58 and the nut, by driving the motor 57.

Figure 8:
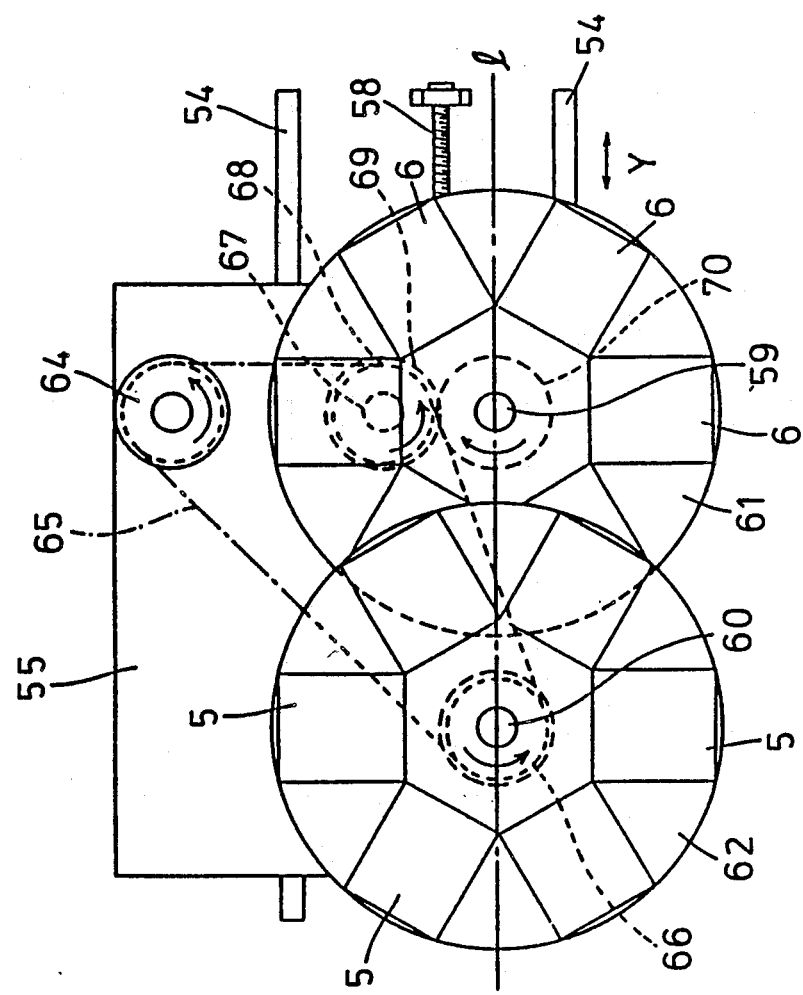
FIG. 8 shows, in plan view, the first and second tables shown in FIG. 6.

On the feed table 55, rotatably disposed are first shaft 59 and a second shaft 60 spaced with a predetermined distance from each other along the guide rails 54 as shown in FIG. 6, the first shaft 59 and the second shaft 60 being positioned in such a way that the line l passing the centers thereof may be parallel with the guide rails 54 (see FIG. 8). On the nose of the first shaft 59, a disc-shaped first table 61 is coaxially mounted to allow loading of a scanning model 6 in position on the top surface thereof. On the other hand, a disc-shaped second table 62 is coaxially mounted on the nose of the second shaft 60 to allow loading of a work piece 5 in position on the top surface thereof. Incidentally, the first shaft 59 and the second shaft 60 are designed to have different heights so that the two tables 61 and 62 may not interfere with each other.

As shown in FIGS. 7 and 8, a motor 63 is mounted on the lower surface of the feed table 55 with its power shaft projecting through the feed table 55 and above the top surface thereof, and a belt 65 fitted around a pulley 64 attached to the power shaft is fitted around another pulley 66 attached coaxially to the second shaft 60. A driven shaft 67 is rotatably supported on the feed table 55 adjacent to the first shaft 59, and the belt 65 is fitted around a pulley 68 attached to the driven shaft 67, so that the driven shaft 67 may rotate in the same direction as the second shaft 60 rotates. A gear 69 is attached to the driven shaft 67 which engages with a gear 70 disposed to the first shaft 59, so that the first shaft 59 may be driven in the direction opposite to that the second shaft 60 is rotated. Namely, upon rotation of the motor 63, for example, counterclockwise as shown in FIG. 8, the second shaft 60 is rotated counterclockwise through the belt 65, whereas the first shaft 59 rotates clockwise through the gears 69 and 70.

In the machining unit 52, a support member 71 extends above the base 53 parallel to the guide rails 54, on which member 71 a pattern sensor (main sensor) 8 and a laser beam machining head 22 are supported. To describe in detail, at the position on the support member 71 above the first table 1, a fitting member 72 is disposed and a main sensor 8 is attached to the fitting member 72 in such a way that it can be ascended and descended, allowing the main sensor 8 to detect the machining pattern 6a depicted on the scanning model 6 loaded on the first table 61; wherein the detection signal from the main sensor 8 is transmitted to the control means (not shown) accommodated in the control unit 51.

Figure 3:
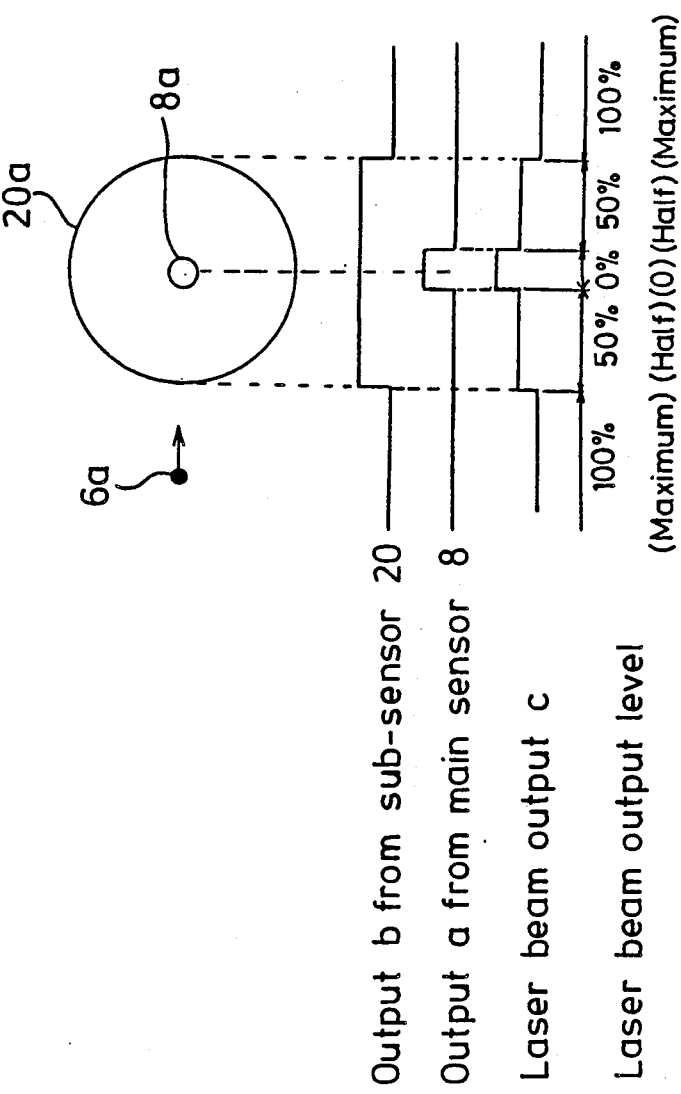
FIG. 3 is a timing chart showing the relationship between the sensor output and the laser beam output correlated with the visual fields of the two sensors shown in FIG. 2.

The main sensor 8 has a sub-sensor 20 being set in such a relationship that the visual field 8a of the main sensor 8 is located concentrically with the visual field 20a of the sub-sensor 20 as shown in FIG. 3. In other words, the sub-sensor 20 is designed to detect the machining pattern 6a depicted on the scanning model 6, with the rotation of the first table 61, for predetermined times prior to and after the detection of said pattern 6a by the main sensor 8. Where neither the sub-sensor 20 nor the main sensor 8 is detecting the machining pattern 6a depicted on the scanning model 6, the output of the laser beam to be irradiated from the laser beam machining head 22 is controlled to be at the maximum level. On the other hand, where only the sub-sensor 20 is detecting the machining pattern 6a, the output of the laser beam is controlled to be at the half of the maximum level; whereas where the two sensors 8 and 20 are both detecting the machining pattern 6a, the laser beam from the laser beam machining head 22 is designed to be interrupted.

As shown in FIG. 6, a laser oscillator 26 accommodating a laser energy source therein is disposed on the top of the machining unit 52. At the nose of a cylinder 75 protruding horizontally from the laser oscillator 26, a reflector-accommodated section 76 is attached to reflect the laser beam emitted horizontally through the cylinder 75 downward at the right angle. Another cylinder 78 for permitting the reflected beam is suspended from the support member 71 through a bracket 77. To the nose of the cylinder 78, the laser beam machining head 22 is attached which converges the laser beam and irradiates it onto the work piece 5 loaded on the second table 62. It should be noted that the output of the laser beam irradiated from the laser beam machining head 22 is designed to be adjusted stepwise in accordance with the pattern detection by the sub-sensor 20 and the main sensor 8. As the means for achieving such adjustment, the one having a constitution as shown in FIG. 2, 4 or 5 can be employed.

The main sensor 8 and the laser beam machining head 22 are positioned above the line l passing the centers of the first shaft 59 and the second shaft 60, so that the main sensor 8 and the laser beam machining head 22 may be shifted toward the corresponding centers of the tables 61 and 62 when the feed table is fed along the guide rails 54. Namely, the laser beam machining head 22 (main sensor 8) is designed to draw a spiral orbit on a horizontal plane as the result of the combination of the rotational movement of the second table 62 (first table 61) and the linear movement of the feed table 55.

In the above embodiment, if the feeding rate of the feed table 55 and the revolution of the tables 61 and 62 are set at constant values, the depth of the protrusions to be carved by the laser beam and the pitch of the spiral orbit change as the laser beam machining head 22 approaches the center of the second table 62. In order to eliminate such changes, a location detector such as a potentiometer is used to detect the position of the feed table 55, whereby the motor 57 is controlled based on the value detected by the detector so that the feeding rate of the feed table 55 may be increased as the laser beam machining head 22 approaches the center of the second table 62. Likewise, the motor 63 is designed to be controlled based on the value detected by the detector so that the revolution of the second table 62 may be increased as the laser beam machining head 22 approaches the center of the second table 62 (making the peripheral speed of the table 62 relative to the laser beam machining head 22 constant). Thus, the phenomenon that the laser beam carving depth and the pitch of the spiral orbit change depending on the position of the second table 62 to be fed in the radial direction can be prevented.

(Function of the second embodiment)

The function of the laser beam machine according to the second embodiment will now be described.

(In setting up for the laser beam machining)

A scanning model 6 having a desired machining pattern 6a depicted thereon as a positive is securely loaded at a predetermined position on the first table 61, while a work piece 5 is loaded on the second table 62 at a position corresponding to the loading position of the scanning model 6. Incidentally a plurality of scanning models 6 and a plurality of work pieces 5 may be loaded on the respective support tables 61 and 62, correspondingly, to effect machining the plurality of work pieces 5 simultaneously (see FIG. 8). The feed table 55 is located at the stand-by position on the left side as shown in FIG. 6, whereas the main sensor 8 and the sub-sensor 20 are located above the right margin of the first table 61, and the laser beam machining head 22 above the right margin of the second table 62.

(In laser beam machining)

When the motor 63 is driven counterclockwise in the above setting up state, the second table 62 loading the work piece 5 thereon rotates counterclockwise through the belt 65. On the other hand, the first table 61 loading the scanning model 6 thereon rotates clockwise through the gears 69 and 70. During the time when the sub-sensor 20 and the main sensor 8 are both detecting the white ground of the scanning model 6, the laser beam machining head 22 irradiates a laser beam at the maximum output level forming a counter on the surface of the work piece 5.

Upon detection of the machining pattern 6a (black portions) depicted on the scanning model 6 by the sub-sensor 20 as the rotation of the first table 61, the output of the laser beam from the laser beam machining head 22 drops to the half of the maximum level. Accordingly, the depth of the counter to be carved by this laser beam will be the half of the depth at the time of maximum output level. Subsequently, upon detection of the machining pattern 6a by the main sensor 8 (at this moment both the sensor 8 and the sensor 20 are detecting the machining pattern 6a), irradiation of the laser beam from the laser beam machining head 22 is interrupted to form the top face of the projection. When the main sensor 8 no more detects the machining pattern 6a as the rotation of the first tale 61 (at this moment the sub-sensor 20 is still detecting the machining pattern 6a), the laser beam is irradiated from the laser beam machining head 22 at the half output level to form a half-depth counter on the surface of the work piece 5. Further, when the sub-sensor 20 no more detects the machining pattern 6athe output of the laser beam irradiated from the laser beam machining head 22 is resumed to the maximum level to form a maximum depth of counter on the surface of the work piece 5.

Figure 9:
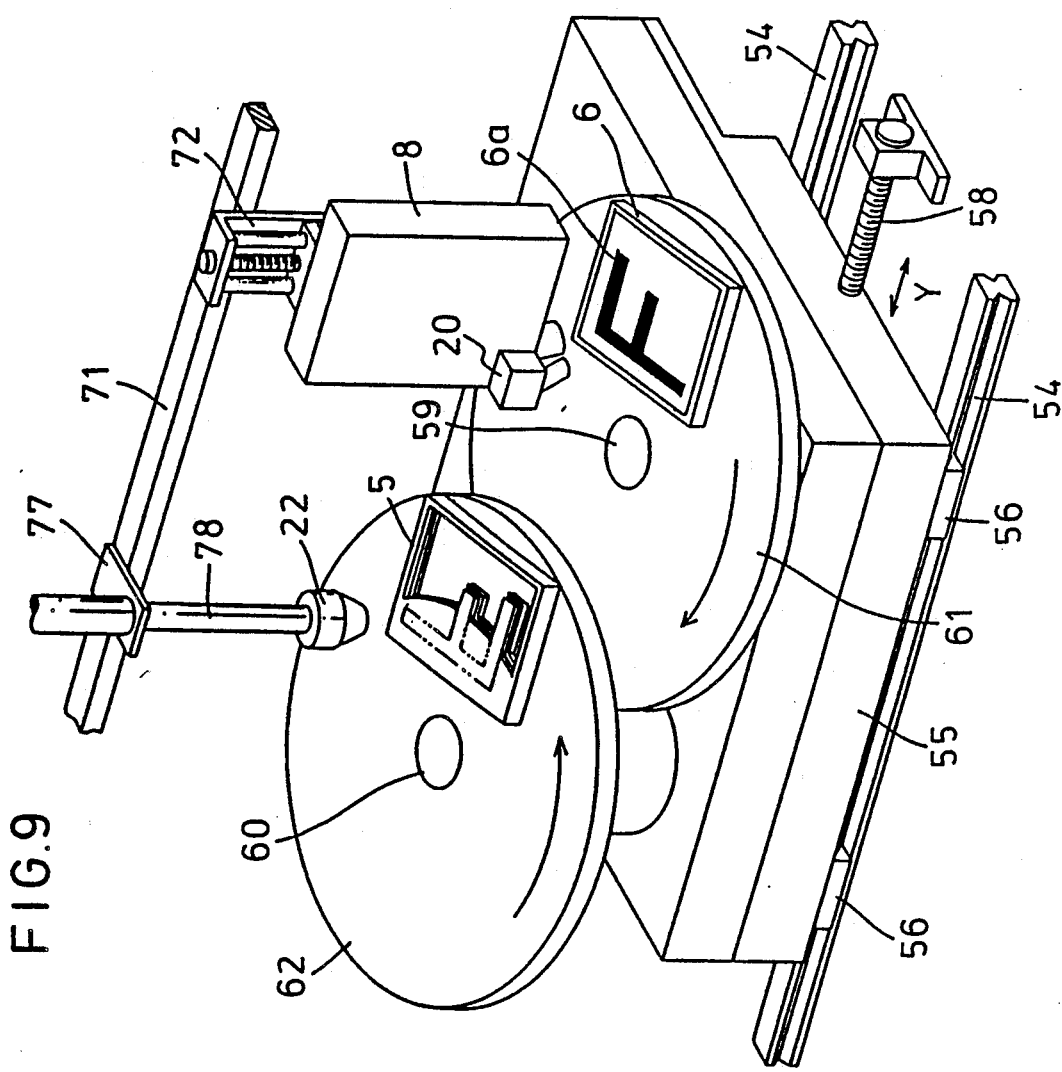
FIG. 9 is a schematic perspective view of the major portions of the machining unit of the apparatus shown in FIG. 6.
Figure 11:
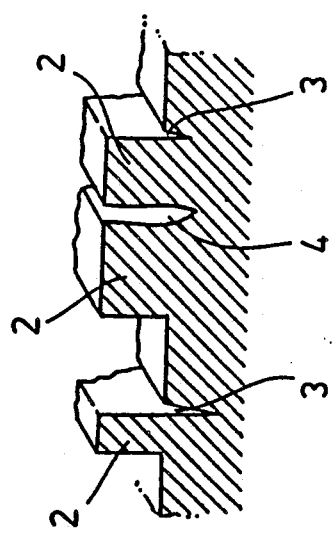
FIG. 11 shows, in cross section, the major portion of a rubber stamp formed by the conventional laser beam machining.
Figure 10:
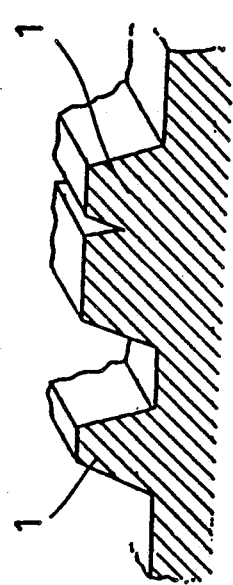
FIG. 10 shows, in cross section, the major portion of a hand-carved rubber stamp.
Figure 13:
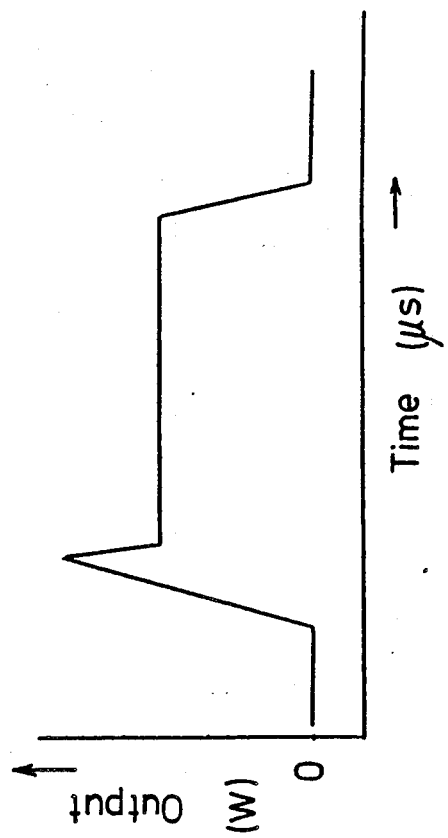
FIG. 13 is a characteristic curve of the laser beam output.

Under the rotation of the first table 61 and the second table 62, the feed table 55 is fed in the direction Y by the motor 57 to allow the sub-sensor 20 and the main sensor 8 to scan the entire surface of the scanning model 6. Incidentally, when the work piece 5 and the scanning model 6 are smaller than the radii of the first and second tables 61 and 62, as shown in FIG. 9, the feed table 55 can be fed to the distance corresponding to the radius of the first table 61 to enable scanning of the entire surface of the scanning model 6 by the sensors 20 and 8.

As has been described above, since the first table 61 and the second table 62 are rotated in the directions opposite to each other, the positive machining pattern 6a scanned by the sub-sensor 20 and the main sensor 8 can be reproduced on the surface of the work piece 5 in the form of a two-stepped protrusion as a negative or a mirror image.

While in the apparatus of the second embodiment, the two tables 61 and 62 are designed to be rotated and fed in the radial direction, the laser beam machining head 22 and the sensors 20 and 8 may alternatively be designed to be rotated and fed in the radial direction. Further, if the first table 61 and the second table 62 are rotated in the same direction, the machining pattern 6a depicted on the scanning model 6 can exactly or approximately be reproduced on the surface of the work piece in the form of protrusions.

What is claimed is:

1. A laser beam machining process in which a main sensor is moved for scanning relative to a scanning model having a machining pattern depicted thereon, and a laser beam generator is moved, in synchronization with this scanning, relative to a work piece comprising a rubbery material such as a natural rubber or elastomer so as to effect laser beam irradiation on the work piece in accordance with the machining pattern detected by the main sensor; characterized in that said main sensor has a sub-sensor for detecting the machining pattern prior to the detection by the main sensor and that control of the output of the laser beam generator is achieved by stepwise shifting in accordance with the pattern detection by these sub-sensor and main sensor, whereby multi-stepped protrusions are formed on the surface of the work piece.

2. A laser beam machine having a main sensor for scanning a scanning model to detect the machining pattern depicted thereon, a laser beam generator for irradiating a laser beam onto the surface of a work piece comprising a rubbery material such as a natural rubber or elastomer in accordance with the machining pattern detected by the main sensor, and a reciprocator which reciprocates the laser beam generator relative to the work piece in synchronization with the scanning of the machining pattern, characterized in that the laser beam machine further comprises:

a sub-sensor for scanning the scanning model to detect the machining pattern depicted thereon in synchronization with the main sensor; and a pair of control means which perform stepwise switching of the output of the laser beam generator in accordance with the machining pattern detected by the sub-sensor and the main sensor; wherein the sub-sensor is designed to be always capable of detecting the machining pattern of the scanning model prior to the detection by the main sensor even when the direction of moving the scanning model by the reciprocator is changed.

3. A laser beam machine, having a main sensor for detecting the machining pattern depicted on a scanning model, and a laser beam generator for irradiating a laser beam onto the surface of a work piece in accordance with the machining pattern detected by the main sensor, characterized in that the laser beam machine further comprises:

a first table mounted on a first shaft rotatably supported in the laser beam machine so that it can mount the scanning model thereon in position;

a second table mounted on a second shaft rotatably supported in the laser beam machine so that it can mount the work piece thereon in position;

a drive means for rotating the first table and the second table in the directions opposite to each other;

a sub-sensor disposed above the first table to be capable of detecting the pattern depicted on the scanning model prior to the scanning by the main sensor; tables in the radial direction relative to the main sensor and sub-sensor and the laser beam generator, correspondingly; and a control means which controls stepwise the output of the laser beam generator in accordance with the machining pattern detected by the sub-sensor and the main sensor.

4. A laser beam machine according to claim 2 or 3, wherein the sub-sensor is designed to be capable of detecting the machining pattern of the scanning model prior to and after the detection of the same by the main sensor.

* * * * *

UNITED STATES PATENT AND TRADEMARK OFFICE
CERTIFICATE OF CORRECTION

PATENT NO. : 5,003,153
DATED : Mar. 26, 1991
INVENTOR(S) : HIROAKI KONDO

It is certified that error appears in the above-identified patent and that said Letters Patent is hereby corrected as shown below:

Title Page:

[73] Assignees: Change "Kabushiki Kaisha, Nagoya; Iida Kogyo Kabushiki Kaisha, Aichi, both of Japan" to --Shachihata Kogyo Kabushiki Kaisha, Nagoya; Iida Kogyo Kabushiki Kaisha, Aichi, both of Japan--

Signed and Sealed this

Twentieth Day of October, 1992

Attest:

DOUGLAS B. COMER

*Attesting Officer*     *Acting Commissioner of Patents and Trademarks*